United States Patent [19]

Morley

[11] 4,079,165

[45] Mar. 14, 1978

[54] COMPOSITE MATERIALS

[75] Inventor: John G. Morley, Little Eaton, England

[73] Assignee: National Research Development Corporation, London, England

[21] Appl. No.: 595,692

[22] Filed: Jul. 14, 1975

Related U.S. Application Data

[63] Continuation of Ser. No. 352,807, Apr. 19, 1973, abandoned, which is a continuation-in-part of Ser. No. 69,845, Sep. 2, 1970, abandoned.

[30] Foreign Application Priority Data

Sep. 6, 1969 United Kingdom ............... 44181/69
Jan. 29, 1970 United Kingdom ................ 4257/70
Aug. 28, 1970 Canada ..................................... 91838

[51] Int. Cl.$^2$ ...................... B32B 1/06; B32B 13/04; B32B 15/04; B32B 17/06; B32B 27/02
[52] U.S. Cl. ........................................ 428/366; 14/22; 52/723; 52/727; 57/144; 428/36; 428/367; 428/368; 428/371; 428/375; 428/376; 428/377; 428/379; 428/394; 428/395; 428/398
[58] Field of Search .................... 57/140 C, 144, 146, 57/149, 152, 153; 428/36, 366, 368, 367, 371, 375, 377, 398, 376, 388, 394, 395, 379; 52/727, 309.15, 309.16, 309.17, 309, 723; 14/22

[56] References Cited

U.S. PATENT DOCUMENTS

| 34,862 | 4/1862 | Morgan et al. ........................ 57/144 |
| 362,642 | 5/1887 | Moxham ............................... 57/146 |
| 911,822 | 2/1909 | Knox ..................................... 428/377 |
| 945,039 | 1/1910 | Katzenstein .......................... 428/377 |
| 1,397,718 | 11/1921 | Bellwald ............................... 57/146 |
| 1,894,461 | 11/1933 | Chisholm .............................. 57/149 |
| 2,049,769 | 8/1936 | Gray ...................................... 57/149 |
| 2,203,387 | 6/1940 | James .................................... 428/377 |
| 2,586,171 | 2/1952 | McMahon ............................ 428/398 |
| 2,865,978 | 12/1958 | Modrey ................................. 57/152 |
| 2,894,366 | 7/1959 | Leckie ................................... 57/149 |
| 2,991,615 | 7/1961 | Stanton ................................. 57/152 |
| 3,455,100 | 7/1969 | Sidles et al. ........................... 57/152 |
| 3,530,959 | 9/1970 | Kopp .................................... 57/144 |
| 3,624,999 | 12/1971 | Young ................................ 57/140 C |
| 3,625,809 | 12/1971 | Caroselli .............................. 57/152 |
| 3,648,452 | 3/1972 | Young .................................. 57/153 |
| 3,922,437 | 11/1975 | Kitta et al. ........................... 57/149 |

*Primary Examiner*—J.C. Cannon
*Attorney, Agent, or Firm*—Cushman, Darby & Cushman

[57] ABSTRACT

A composite article comprising at least two load-bearing members one within the other and having mutually contacting surfaces adapted to generate a restraining force resisting relative axial movement of the members, wherein the members are constructed such that a local reduction in said restraining force takes place as the local tensile stress in the article increases.

26 Claims, 4 Drawing Figures

Inventor:
JOHN G. MORLEY

COMPOSITE MATERIALS

The invention relates to composite materials and this application is a continuation of application Ser. No. 352,807 filed Apr. 19, 1973, now abandoned, which in turn is a continuation-in-part of application Ser. No. 69,845 filed Sept. 2, 1970, now abandoned.

The high strength fibres such as boron, carbon, glass and high strength steel generally used in the construction of composite materials are brittle and do not absorb any significant amount of energy during fracture. Most materials used as the matrix in fibre-reinforced composite materials such as epoxy resins for example, only absorb relatively small amounts of energy during fracture and form only a relatively small fraction of the volume of the composite materials. Energy is primarily absorbed by the process of pulling broken fibres out of the matrix as a result of frictional losses or by deformation processes taking place at the interfaces between fibres and matrix.

In order to increase the energy absorbed during fracture before complete failure of the composite material occurs, it is necessary to inhibit crack propagation from fibres which fail to the matrix and subsequently to adjacent fibres. Additionally it is desirable to arrange that the fibres pull out from the matrix at a fibre stress less than the ultimate tensile strength of the fibres. It is known that this can be achieved in principle by ensuring that the fibres do not exceed a critical length $lc$ given by:

$$lc = (df\,sf)/2T$$

for a cylindrical fibre
where
$df$ = fibre diameter
$sf$ = fibre ultimate tensile strength
$T$ = interfacial shear strength.

This argument assumes that the interfacial shear strength has a constant value and predicts the behaviour of fibre composites to a first approximation. On the basis of this argument the tensile stress in a fibre of length equal to $lc$ increases uniformly from zero at the ends of the fibre to a maximum value at the central point which approaches the utlimate tensile strength of the fibre. It follows that on average the stress in the fibre is only one half that of the maximum value so that a short fibre of length equal to $lc$ will only contribute to the properties of the composite one half of the strength and the stiffness of that part of a continuous fibre occupying the same volume fraction of the composite. When composite failure takes place fibres pull out of the matrix across one particular cross-section of the composite, and the deformation processes tend to be confined to a localised region of the composite. This is because the stress necessary to cause fibre pull out diminishes as a fibre is pulled out of the matrix, being proportional to the length still embedded, and the local strength of the composite diminishes as each fibre pulls out.

Short fibres, therefore, have limitations set upon their contribution to the strength and energy absorbing characteristics of a fibre composite and additionally present fabrication problems. When continuous fibres are used to reinforce a matrix however, the elastic deformation of both matrix and fibres aligned in the direction of the applied stress are almost the same. Such fibres, therefore, contribute almost the whole of their intrinsic stiffness characteristics to those of the composite and allow convenient fabrication processes to be used. However, when continuous fibres are used the composite fails in tension at approximately the failing strain of the fibres with a relatively small amount of energy absorption generated by fibres which have failed at some point only a little distance away from the main region of failure, pulling out of the matrix.

The present invention is concerned with this problem and provides a composite article comprising at least two load-bearing members one within the other and having mutually contacting surfaces adapted to generate a restraining force resisting relative axial movement of the members wherein the members are constructed such that a local reduction in said restraining force takes place as the local tensile stress in the article increases.

The article may comprise a reinforcing element in the form of a core fibre within a sheath, a number of which elements could be used in the construction of a fibre-reinforced composite material, or the article may be a composite material comprising a fibre within a surrounding matrix.

The restraining force between the elements will generally arise from frictional forces which resist relative sliding movement of the elements. However the restraining force could be derived in some other fashion, for example, it could be a chemical bond the structure of which is altered under tensile stress.

Preferably said restraining force is arranged to reduce locally to zero at a local fibre tensile stress a little less than the ultimate tensile strength of the fibre. In this way failure of the fibre cannot be caused by deformation of the composite regardless of the length to diameter ratio of the fibre. Stress transfer takes place from the matrix to the fibre by shear stresses acting at the interface predominently in relatively short lengths of fibre near the fibre end. The tensile stress is, of course, zero at the ends of a fibre so that the shear strength of the fibre/matrix interface has a maximum value at the ends. The shear stress transfer from matrix to fibre is therefore at a maximum at the end of the fibre and diminishes with increasing distance along the fibre. The tensile stress in the fibre, being equal to the summation of the shear forces acting at the interface, increases asymptotically to some upper limiting value over the central regions of the fibre where no further shear stress is transferred because the shear strength of the interfacial contact tends to zero.

In this specification and the appended claims the term "fibre" is used in a broad sense to refer to filamentary or fibriform material of whatever composition and of a flexible or rigid nature, and is not intended to refer only to fibres of the materials referred to previously nor to any particular length or diameter of material. In certain applications of the invention the items termed "fibres" may be more in the nature of rods or bars and the expression "fibre" should be construed accordingly.

Examples of composite materials in which the local shear strength of the interfacial contact, and the local shear stress transmitted across the interface, can be made to vary according to the local tensile stress in the fibre are given below. In these examples the interfacial shear stresses are generated by frictional forces at the fibre/matrix interface.

One manner of producing the desired variable shear strength interface is by twisting or bending a fibre into a convoluted form (referred to as the "fibre form"), and drawing it into a bore formed in a matrix. This can be done for example by attaching one end of such a fibre form to a straight wire previously inserted into the bore and of smaller diameter than that of the bore. By drawing the straight fibre through the bore the end of the fibre form is drawn into the bore. Because the convolutions of the fibre form press against the sides of the bore a frictional force is generated which tends to resist further motion of the fibre through the bore. As a consequence the straight fibre experiences a tensile force which is transmitted to the end of the fibre form to which it is attached. Under the application of the tensile force the portion of the fibre form within the bore attempts to straighten itself and as a result the convolutions press less strongly on the walls of the bore. This in turn reduces the local frictional force exerted by the walls of the bore on this portion of the fibre form and the fibre form can be drawn further into the bore. The amount by which the local frictional force is reduced increases as the local tensile stress carried by the fibre form is increased. As the fibre form is drawn further into the, bore however, the frictional force exerted by the walls of the bore on the increasing inserted length of the convoluted fibre increases and so does the tensile force necessary to pull the fibre further into the bore. However, when this tensile force is such that successive parts of the fibre form within the bore are straightened to such an extent as not to exert a pressure on the walls of the bore, no further increase in tensile force is necessary to pull more of the fibre form into the bore. Very long lengths of such fibre form can therefore be pulled into the bore the tensile force required to do so being almost independent of the length of the fibre form after an initial critical value has been reached. Preferably it is arranged that the critical tensile force at which level the frictional force at the interface tends to zero approaches a value equivalent to the ultimate tensile strength of the actual fibre but it must not, of course, exceed it.

Figure 1:
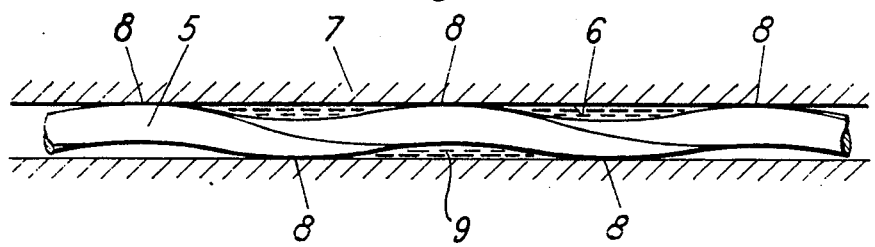
FIG. 1 is a greatly enlarged longitudinal cross-section through a composite material showing part of a reinforcing member located in a bore in the material.

Having drawn the fibre form into position in the bore the straight wire is removed so that the convolutions of the fibre form now exert their designed pressures on the walls of the bore at the respective interfaces. In FIG. 1 of the drawings a helically twisted fibre 5 is shown in position in a bore 6 in a matrix 7, interfacial contact between the fibre and the matrix producing a restraining force resisting relative axial movement of the members, this restraining force being generated by frictional forces at the interfaces 8. The arrangement is such that the shear strength of the interfacial contact with the wall of the bore (i.e. the restraining force) will reduce as tension applied to the fibre increases.

It will be appreciated that, neglecting end effects, when a very long fibre of this general type is used to reinforce a matrix most of the fibre is placed in a state of high and uniform tensile stress when a tensile stress is applied to the composite and, therefore, it reinforces the matrix very efficiently from the point of view of contributing to the strength and stiffness of the composite. Should local failure of the composite occur due to local unacceptable strains the fibres will not fail but will tend to be pulled out of their holes in the matrix with similar mechanisms operating as those described above for the fibre being pulled into the matrix. As the composite is strained further, therefore, the fibres are pulled further out of their holes but at a constant stress level and for distances which can be very large being limited only by the lengths of the fibres. Such a system can, therefore, accommodate very considerable deformation and a very large amount of work has to be done before failure eventually takes place.

This behaviour has been observed experimentally using a steel piano wire as a fibre. This was coiled by being wound round a circular sectioned bar to form a helix and then extended under a high tensile stress to form an almost straight length of wire but having a small amplitude sinuous deformation impressed upon it. The wire was then pulled into a length of hypodermic tubing (stainless steel) to form an element representing a portion of a composite matrix, the bore of the tube being larger than the diameter of the wire but less than the amplitude of the convolutions of the wire. A frictional force was generated as described previously and this was observed as the wire was pulled through a short length of tube. The magnitude of the frictional force could be adjusted by changing the wire thickness and the amplitude and frequency of the convolutions. The magnitude of the frictional force was also found to be reduced with increasing tensile stress applied to the wire and the theoretical shape of the stress strain curve obtained when the wire was pulled into and out of the tube showed a high and almost constant tensile stress being applied to cause pull out over almost the whole of the embedded length of the wire. Tensile failure of the tube (matrix) did not cause failure of the wire and the work expended to cause eventual failure of the element was very high. Similar results were obtained with curved instead of straight tubing.

It will be appreciated that many different materials can be used in this way to produce high energy absorbing composites. One possibility is glass fibre because of its very high cost effectiveness in terms of tensile strength and another is carbon fibre. A plurality of such fibres may be embedded in a polymeric or other matrix to form a sinuous reinforcing element to be inserted into a bore.

Figure 2:
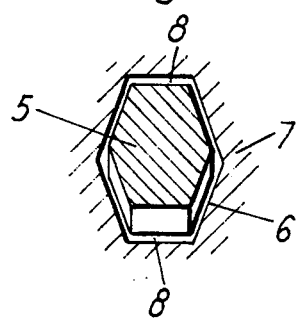
FIG. 2 is a transverse cross-section showing a modification.

It will also be appreciated that the fibre and tubes or bores formed in a matrix can take various geometrical forms. The fibre can be curved helically or could alternatively have a sinusoidal curvature in one plane only. Again the fibre and the bore in which it is received need not be circular in cross-section. A bore of elliptical cross-section could be utilised or the cross-section could take the form of a back-to-back double wedge (FIG. 2). Such an arrangement has the effect of increasing the frictional force resisting axial displacement of the fibre in the bore because the surface area of the fibre in contact with the wall is increased and the force tending to push the fibre further into the wedge (first to one side and then to the other as a result of the elasticity of the fibre and the amplitude of its sinuous convolutions) is magnified normal to the surface of the wedge due to the geometry of the system. Since both the surface pressure and area of contact are increased the frictional force is also increased. However, because of the sinusoidal curvature of the fibre it tends to straighten when under a tensile stress and this has the effect of pulling the portions of fibre out from between the wedge faces thus reducing the frictional force exerted. The behaviour of such system is, therefore, qualitatively similar to that of a sinuously curved circular section wire inserted into a circular section hole as previously described.

Since the reduction in the frictional restraining force under tensile load is brought about by differential lateral contraction of the wire and the wall of the bore in which it is located, the effect is akin to that which would arise if two elements having different Poisson's Ratios were located one within the other and subjected to tensile stress. The magnitude of the lateral contraction is, however, very much greater than the lateral contraction brought about by Poisson's Ratio effects alone, the increase being generated by the geometrical form of the system. This difference in what may be termed the "effective Poisson's Ratios" of the inner member and that which surrounds it is an important feature of the invention. Thus it should be understood that the term "effective Poisson's Ratio" as used in this specification and the appended claims refers not only to the ratio of transverse to longitudinal strain in a solid piece of material, but more generally to the ratio of overall transverse strain to overall longitudinal strain in an element regardless of whether the strain is a characteristic of the material of the element (i.e. its actual Poisson's Ratio), or its geometrical shape, or a combination of both.

A further approach arises from the fact that surface compressive forces are generated on the fibres of composite materials following fabrication of the composite at high temperatures and cooling to room temperature. The magnitude of the forces depends on the difference between the thermal contractions and on the elastic characteristics of the materials. If the fibres were to have a higher actual Poisson's Ratio than the matrix, the fibres would tend to contract laterally away from the matrix under tensile stress, hence reducing the pressure of the matrix on the fibre surface and the associated frictional forces by which shear stresses are transferred from matrix to fibre. The following two examples illustrate how this may be put to practical effect.

Figure 3:
FIGS. 3 and 4 are views similar to FIG. 1 showing further modifications.

In the first case the actual Poisson contraction of the matrix around each fibre may be inhibited whilst allowing the fibre to contract laterally as a result of its own actual Poisson's Ratio under an applied tensile stress, thus exaggerating the lateral contraction of the fibre within the matrix by producing an effective Poisson's Ratio in the matrix different from its actual Poisson's Ratio. This can be achieved (FIG. 3) by local reinforcement of the matrix 7 using, for example, a closely-wound helix 10 of thinner fibres wound round each of the main fibres 5. The helical winding will undergo very little lateral contraction when extended and will resist the forces of contraction generated in the matrix 7 thereby allowing the main fibre 5 to contract away from the windings 10 and the matrix.

Figure 4:
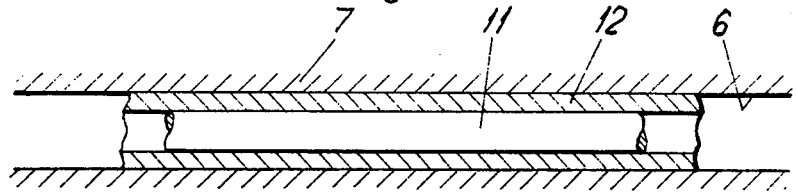

In the second case use is made of the fact that the value of Poisson's Ratio is fairly constant for most elastic solids, having a numerical value of about 0.3, whereas the Poisson's Ratio for nonelastic deformation can be different, for example a plastically deforming metal has a Poisson's Ratio of 0.5. A fibre (FIG. 4) consisting of a material 11 having an orthodox Poisson's Ratio of 0.3 surrounded by a layer 12 of soft metal will therefore have an intermediate Poisson's Ratio depending on the relative cross-sectional areas of fibre and coating layer. Taking, for example, equal cross-sectional areas of fibre and coating layer, a coated fibre experiencing an elastic extension of about 1% will be showing a lateral contraction of about 0.4%, or about 0.1% more than the contraction of the matrix around it under the influence of its own Poisson's Ratio effect. Using components with suitable elastic characteristics this differential contraction can be sufficient to eliminate the compressive force exerted by the matrix on the fibre to facilitate debonding and correspondingly reduce the shear stress at the interface to zero. In such a system, therefore, the elastic strain in a fibre generated by a deformation of the matrix is limited to the tensile stress at which debonding occurs as a result of differential lateral contraction of the fibre. Providing this is less than the strain in the fibre corresponding to its ultimate tensile strength, the fibre cannot fracture. Increased longitudinal deformation of the composite results in the wall of the cylindrical hole formed by the fibre in the matrix slipping past the fibre and absorbing energy in so doing. Since the highly stressed regions of the fibres in such a system are not bonded to the matrix, cracks propagating in the matrix cannot cause local failure of the fibres and the composite is, therefore, insensitive to cracks or notches.

The amount by which the surface pressure on the fibre is reduced under tension depends not only on the relative lateral contraction of fibre and matrix under an applied tensile load but also on the elastic moduli of the components and the elastic interactions between them. As long as the stiffness of the matrix is not so low that elastic contraction of the matrix follows Poisson contraction of the fibre without the pressure of the matrix on the surface of the fibre being significantly reduced, the desired results can be achieved. A further possibility is to increase the elastic modulus of the matrix by the use of particulate fillers or by local fibre reinforcement.

An important attribute of the variable shear strength system is that energy can be absorbed by friction over a very large amount of internal interface extending throughout the body of the composite. In the case of orthodox materials the energy absorbed during fracture is localised either by the local "necking down" observed with ductile metals or by energy absorbing processes going on around the tip of a propagating crack. In such materials the bulk of the sample is undisturbed by the fracture process. The composite system described, however, allow energy to be absorbed throughout the whole of the material, although the applied stress tending to cause deformation and failure of the composite may be localised.

The above techniques have, of course, been described on the basis that the fibres have substantially smooth surfaces, whereas in practice surface irregularities may occur and if the matrix follows these irregularities there is the danger that a "keying" effect will be produced which will interfere with freedom of the fibres to slide relative to the matrix on debonding and will limit the advantages of a weak bond from the point of view of crack propagation under longitudinal stresses.

In order to overcome this difficulty the surfaces of the fibres may be chemically etched to reduce the relative height of any irregularities. Such treatment could be effected to a precursor textile fibre before pyrolysis to form a carbon fibre, or after pyrolysis.

After pyrolysis etching could be effected by oxidation in air or in a gas containing oxygen at a temperature of a few hundred degrees Centigrade. Alternatively, etching could be effected using an acid such as nitric acid.

In an alternative, preferred, method a physical interlayer is deposited on each fibre to present a smoother outer surface on which the matrix material can be deposited, or in the case of materials using convoluted fibres where there are spaces between the fibres and the matrix, these could be filled with the interlayer material. Such a layer would be of low mechanical strength so as to act essentially as a dry lubricant and a thin layer of pyrolytic graphite may advantageously be used. The graphite layer may be deposited, for example, by gas phase deposition or by pyrolitic conversion of a polymer film previously deposited on a carbon substrate fibre.

By use of a polymeric material which will retain its initial shape during pyrolysis some of the gases given off during pyrolysis will diffuse out of the polymer film at the film/fibre interface and the pressure so generated will tend to push the film away from the fibre, thereby creating the desired weak bond at the interface. By appropriate control of the heat treatment applied to effect pyrolysis, the rate of evolution of gas and thereby the nature of the interface can be controlled. Thus controlled separation of the interlayer from the fibre due to the evolution of gases during conversion of the polymer interlayer is possible.

In these ways surface irregularities of the core fibres can be taken account of, thereby enabling the techniques disclosed above to be more widely applied.

Thus the invention provides high energy absorbing composite materials of a strong and, in many instances, relatively lightweight nature, which could be used, for example, for blade containment in large gas turbine engines or to improve the work of fracture of existing carbon fibre composite materials. The main advantages include very high works of fracture, efficient use of the reinforcing elements, reduction of the possibility of local failure, stress transfer to unbroken reinforcing fibres during the failure process, and convenient and cheap fabrication techniques. Materials according to the invention may be used to design structures capable of containing large stable cracks, this improved structural efficiency leading to weight and cost saving.

Various modifications in the materials involved and in the manner of producing the desired variable shear strength interfacial contact may be made without departing from the invention. For example, the invention may be applied to the production of much less sophisticated composite materials, such as reinforced concrete having a concrete matrix and fibres in the form of steel rods or bars or of glass fibres in resin. Moreover, where there are spaces between the matrix and the core, such spaces may be filled with a viscous medium as indicated at 9 in FIG. 1 to give a dashpot type action, or other liquids could be similarly utilised for different purposes. For example, liquids whose viscosities change with the increase in temperature resulting from the work done against friction could be used. It should be appreciated that the matrix could consist of any suitable material including polymers, metals and concrete and the reinforcing fibres could be of metal, carbon, boron, glass or other suitable material.

Moreover, while reference is made herein primarily to materials having a matrix reinforced by a plurality of single continuous fibres, in some instances these fibres may be surrounded by a further load-bearing member in the form of an interlayer or coil forming a sheath, and the invention is equally applicable to other core/sheath fibre composites. In all the arrangements shown in the drawings, for example, the matrix may be replaced by a tubular load-bearing sheath thereby forming a composite article which may be used as a reinforcing element by embedding it in a matrix. Core/sheath elements of this kind could alternatively be twisted together to form a composite rope-like structure. In a further alternative a fibre having a cross-section similar to that shown in FIG. 2 of the drawings could be surrounded by a tubular sheath of similar cross-section to form a reinforcing element, and a plurality of such elements could be nested together to form a honeycomb structure held together by a suitable adhesive applied to the outer surfaces of the sheaths.

I claim:

1. A composite article comprising an elongated stiff outer member having at least one elongated bore therein and an inner member extending within at least part of said bore, said inner member serving to reinforce said outer member so that both said inner and outer members serve simultaneously to resist a tensile load applied to said composite article in substantially the direction of the longitudinal axis of said outer member, at least part of said inner member engaging the surface of said bore to engender frictional force tending to resist longitudinal movement of at least part of said inner member relative to said outer member, such that the application of a tensile stress to at least part of the article substantially in the direction of the longitudinal axis of said outer member causes a tensile stress to be transmitted to at least part of said inner member, the material of the outer member having an effective Poisson's ratio lower than the effective Poisson's ratio of the inner member, whereby said tensile stress caused in the inner member tends to reduce the resistive frictional force at at least another part of the inner member to zero, thereby permitting relative movement between said outer member to zero and said other part of the inner member.

2. A composite article according to claim 1 wherein the inner member is a fibre.

3. A composite article according to claim 1 in the form of a composite reinforcement element wherein the inner member is a fibre and the outer member is a tubular sheath.

4. A composite article according to claim 1 wherein a local reduction of said resistive force to zero takes place at a local tensile stress in the article just less than the ultimate tensile strength of the inner member.

5. A composite article according to claim 1 wherein the inner member is formed from stainless steel.

6. A composite article according to claim 1 wherein the inner member is formed from a polymeric resin having glass fibers embedded therein.

7. A composite article according to claim 1 wherein said inner member comprises a layer of soft metal surrounding a central core.

8. A composite article according to claim 1 wherein the outer member is provided with fibre reinforcement.

9. A composite article according to claim 1 wherein the outer member is formed from a polymerizable material and the inner member is an elongated fibre selected from the group consisting of carbon, boron, glass and high strength steel.

10. A composite article according to claim 1 wherein the outer member is concrete and the inner member is selected from the group consisting of steel in rod or bar form and bundles of glass or other fibres in a polymeric material.

11. A composite article according to claim 1 wherein the ultimate tensile strength of the said inner member is just greater than the tensile force required to be applied to a part of said inner member to reduce the frictional force between said inner member part and said outer member sufficiently to permit relative longitudinal movement between that part of said inner member and said outer member.

12. A composite article according to claim 1 wherein the outer member is formed from a polymerizable material containing particulate fillers to increase the elastic modules of said outer member.

13. A composite article according to claim 1 wherein the inner member is of convoluted form.

14. A composite article according to claim 13 wherein spaces at the interfacial region are filled with a viscous medium.

15. A composite article according to claim 1 wherein the outer member is reinforced to inhibit inward contraction under tensile load.

16. A composite article according to claim 15 wherein said reinforcement is effected by means of a closely-wound helix of reinforcing fibres, thinner than the inner member, wound round the inner member, and defining said bore in the outer member.

17. A composite article according to claim 1 wherein the surface of the inner member is treated to reduce surface irregularities.

18. A composite article according to claim 17 wherein said surface irregularities are reduced by chemical etching.

19. A composite article according to claim 18 wherein said etching is applied to a precursor textile fibre before pyrolysis to form a carbon fibre.

20. A composite article according to claim 18 wherein said etching is effected by oxidation at elevated temperature.

21. A composite article according to claim 17 wherein said surface irregularities are reduced by depositing a physical interlayer on the inner member.

22. A composite article according to claim 21 wherein said interlayer acts as a dry lubricant.

23. A composite article according to claim 22 wherein said interlayer comprises pyrolytic graphite.

24. A composite article according to claim 23 wherein said interlayer is applied by gas phase deposition.

25. A composite article according to claim 23 wherein said interlayer is applied by pyrolytic conversion of a polymer film deposited on a carbon substrate inner member.

26. A composite article comprising an elongated outer member which is substantially inelastic, said outer member having at least one longitudinal bore therein, and an elongated inner member within said bore, said inner member being substantially inelastic, so that both said inner and outer members serve to simultaneously resist a tensile load applied to the composite article in a longitudinal direction, said inner member engaging the surface of said bore to engender a frictional force tending to resist relative longitudinal movement between said outer and inner members, and the material of said outer member defining said bore having an effective Poisson's Ratio lower than the effective Poisson's Ratio of said inner member, whereby application to the composite article of a longitudinal tensile load above some minimum value causes a reduction in the frictional force between a part of said inner member and said outer member, and increasing values of such longitudinal tensile load cause progressive reduction of the frictional force between successive parts of said inner member and said outer member.

* * * * *